US012742880B2

(12) United States Patent
Salomon

(10) Patent No.: US 12,742,880 B2
(45) Date of Patent: Sep. 22, 2026

(54) METHOD FOR COMPUTATIONAL NOISE COMPENSATION, ULTRASOUND SENSOR SYSTEM, AND MOTOR VEHICLE

(71) Applicant: VALEO SCHALTER UND SENSOREN GMBH, Bietigheim-Bissingen (DE)

(72) Inventor: Sylvio Salomon, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 251 days.

(21) Appl. No.: 18/716,140

(22) PCT Filed: Nov. 30, 2022

(86) PCT No.: PCT/EP2022/083834
§ 371 (c)(1),
(2) Date: Jun. 4, 2024

(87) PCT Pub. No.: WO2023/104603
PCT Pub. Date: Jun. 15, 2023

(65) Prior Publication Data

US 2025/0035783 A1 Jan. 30, 2025

(30) Foreign Application Priority Data

Dec. 6, 2021 (DE) ..................... 10 2021 132 027.5

(51) Int. Cl.
*G01S 15/93* (2020.01)
*G01S 15/931* (2020.01)

(52) U.S. Cl.
CPC ....... *G01S 15/931* (2013.01); *G01S 2015/938* (2013.01)

(58) Field of Classification Search
CPC ........ G01S 15/00; G01S 15/93; G01S 15/931; G01S 2015/938
See application file for complete search history.

(56) References Cited

U.S. PATENT DOCUMENTS 4,382,291 A * 5/1983 Nakauchi .............. G01S 15/526 340/552
5,124,954 A 6/1992 Hordijk
7,034,744 B2 * 4/2006 Zimmermann ....... G01S 7/2922 367/100

FOREIGN PATENT DOCUMENTS

DE 102013204910 A1 * 9/2014 ........... G01S 15/582
DE 102017105207 A1 * 9/2018 ........... G01S 13/862
(Continued)

OTHER PUBLICATIONS

Machine Translation of DE 102013204910 A1 (Year: 2006).*
(Continued)

*Primary Examiner* — Nguyen Q. Ha
(74) *Attorney, Agent, or Firm* — Osha Bergman Watanabe & Burton LLP

(57) ABSTRACT

A method is disclosed for computational noise compensation for an ultrasound sensor system. The method includes acquiring multiple reference signal representations at different points in time, storing the multiple reference signal representations, acquiring a measurement signal representation by emitting an ultrasound emission signal using the ultrasound sensor and receiving an ultrasonic reception signal using the same or the other ultrasound sensor, selecting one of the stored reference signal representations, and generating a noise-compensated measurement signal representation by subtracting the selected reference signal representation from the acquired measurement signal representation.

17 Claims, 3 Drawing Sheets

(56) References Cited

FOREIGN PATENT DOCUMENTS

| | | | | | |
|---|---|---|---|---|---|
| DE | 102019207029 | A1 | * | 11/2020 | ........... G01S 15/931 |
| DE | 102019123822 | A1 | | 3/2021 | |
| DE | 102019134307 | A1 | | 6/2021 | |
| EP | 3096161 | A1 | * | 11/2013 | ......... G01S 7/52001 |
| WO | 2019/137784 | A1 | | 7/2019 | |

OTHER PUBLICATIONS

Machine Translation of DE-102017105207-A1 (Year: 2006).*
Machine Translation of DE 102019207029 A1 (Year: 2020).*
Machine Translation of EP-3096161-A1 (Year: 2013).*
International Search Report issued in corresponding German Patent Application No. 10 2021 132 027.5 mailed Jul. 19, 2022 (7 pages).
International Search Report issued in corresponding International Application No. PCT/EP2022/083834 mailed Mar. 1, 2023 (6 pages).
Written Opinion issued in corresponding International Application No. PCT/EP2022/083834 mailed Mar. 1, 2023 (6 pages).

* cited by examiner

METHOD FOR COMPUTATIONAL NOISE COMPENSATION, ULTRASOUND SENSOR SYSTEM, AND MOTOR VEHICLE

The present invention relates to the use of ultrasound measurement technology in motor vehicles and in particular a method for computational noise compensation for an ultrasound sensor system of a motor vehicle, an ultrasound sensor system for a motor vehicle, which carries out the method, and a motor vehicle having the ultrasound sensor system.

Motor vehicles are equipped with ultrasound sensors, which emit ultrasonic emission signals into the surroundings of the motor vehicle and receive ultrasonic reception signals from the surroundings of the motor vehicle. A distance to an obstacle in the surroundings of a motor vehicle is determined and provided to a driving or parking assistance system of the motor vehicle with reference to a signal time-of-flight between emission of the ultrasonic emission signal and arrival of an airborne sound echo in the ultrasonic reception signal.

To meet customer requirements, ultrasound sensors are also installed covered, wherein an element of a vehicle outer skin is coupled to the membrane of the ultrasound sensor. However, in this case structure-borne sound arises in the vehicle outer skin, and structure-borne sound echoes are overlaid on the airborne sound echoes in the ultrasonic reception signal as noise.

WO 2019/137784 A1 discloses reflective elements in a bumper, which reduce propagation of the structure-borne sound in the bumper by destructive interference.

WO 2007/012958 A2 discloses a method in which, by comparing multiple ultrasonic reception signals received at time intervals in relation to one another, an airborne sound echo contained therein is identified, which originates from an obstacle invariant in relation to the motor vehicle, such as a trailer hitch fastened on the motor vehicle. The airborne sound echo is removed during subsequent measurements by computation from the ultrasonic reception signals.

DE 10 2013 204 910 A1 discloses a method, in which a reference signal is subtracted from a measurement signal of an ultrasound sensor in order to reduce or remove decay signals contained in the measurement signal.

U.S. Pat. No. 5,124,954 A discloses a method for distance measurement by means of ultrasound, in which in the absence of an object to be measured, a reference measurement is carried out and a reference signal is obtained and stored, which contains interference sound that was reflected from objects not to be measured. During a later measurement in the presence of the object to be measured, the stored reference signal is subtracted from the measurement signal in order to improve its noise distance.

However, in particular with ultrasound sensors installed covered, there is a problem that the interfering structure-borne sound pattern changes under influences such as temperature, material aging, and the like. Even small deviations of the structure-borne sound pattern from the previously stored reference signal result in inadequate compensation of the structure-borne sound.

DE 10 2019 123822 A1 therefore proposes repeating a reference measurement to acquire a reference signal in operation of the vehicle at regular intervals in order to update the reference signal. An obstacle can be located in the surroundings of the vehicle during operation of the vehicle, however. If a reference signal is acquired which, in addition to the structure-borne sound echo, also contains an airborne sound echo reflected from the obstacle, the airborne sound echo and therefore the obstacle is incorrectly suppressed during subsequent measurements by subtraction of the reference signal. DE 10 2019 123822 A1 therefore proposes identifying such obstacles present during reference measurements in the surroundings of the vehicle on the basis of a signal shape change, which occurs if the obstacles change their relative position in relation to the vehicle.

Against this background, the invention is based on the object of further improving the computational noise compensation of an ultrasound system of a motor vehicle.

Under a first aspect, a method for computational noise compensation for an ultrasound sensor system of a motor vehicle is therefore proposed. The method comprises the following steps: a) acquiring multiple reference signal representations at different times in each case by emitting an ultrasonic emission signal using an ultrasound sensor of the ultrasound sensor system and receiving an ultrasonic reception signal using the same or another ultrasound sensor of the ultrasound sensor system; b) storing the multiple reference signal representations; d) acquiring a measurement signal representation by emitting an ultrasonic emission signal using the ultrasound sensor and receiving an ultrasonic reception signal using the same or the other ultrasound sensor; e) selecting one of the stored reference signal representations; and f) generating a noise-compensated measurement signal representation by subtracting the selected reference signal representation from the acquired measurement signal representation.

The proposed method provides a reference signal base from multiple and preferably a large number of stored reference signal representations, which are acquired and stored for different support points—at different times and thus in particular with different interfering influences. The quality of the noise compensation can advantageously be improved in that a suitable one of the multiple reference signal representations is deliberately selected during a respective measurement. In particular, in situations in which an obstacle is possibly located in the surroundings of the motor vehicle, but an adaptation of the reference signal representation is required—for example at a standstill of the motor vehicle—a suitable one of the stored reference signal representations can be used, instead of having to use a currently acquired reference signal representation, which would possibly be corrupted by the obstacle.

The selection is in particular a deliberate selection. The selection can preferably be carried out on the basis of a comparison of the stored reference signal representations to the acquired measurement signal representation and/or on the basis of a comparison of conditions influencing noise during the acquisition of the reference signal representations in step a) to conditions influencing noise during the acquisition of the measurement signal representation in step d). A deliberate selection can therefore advantageously take place such that in subsequent step f) the signal components of the measurement signal caused by noise are reduced as much as possible and preferably are removed as exactly and completely as possible from the measurement signal. Various techniques for selecting the reference signal representation for use in step f) will be described in more detail with reference to the advantageous embodiments presented hereinafter.

There is no strict restriction with respect to the order of the execution of steps a) and b), on the one hand, and d), e), and f), on the other hand. That is to say, for example, in operation, while the motor vehicle is driving and already carrying out measurements according to steps d), e), and f), reference signals can still also be acquired according to steps a) and b). In this case, steps a) and b), on the one hand, and d), e), and f), on the other hand, can be executed alternately. However, it is also conceivable that an acquired signal representation is used, on the one hand, as a measurement signal representation, but also, on the other hand, as a reference signal representation-possibly to be filtered-thus steps a) and d) are carried out at the same time or are the same step. In other words, the reference signal base can be progressively updated in operation without having to discard reference signal representations which were already acquired earlier. In the course of the service life of the motor vehicle, a comprehensive reference signal base having a large number of support points adapted to the operational reality of the motor vehicle can thus be created.

The respective ultrasonic emission signal can be, for example, a pulse modulated onto an ultrasonic carrier frequency. The ultrasonic reception signal can be received over a predetermined time period after emission of the ultrasonic emission signal. In other words, the ultrasound sensor can be put into a receiving mode for the predetermined time period after emission of the ultrasonic emission signal. The ultrasound sensor can be provided with a piezoelectric element, which converts oscillations of an ultrasound membrane of the ultrasound sensor that are excited by incident ultrasonic waves into an electrical signal, which can be referred to as the ultrasonic reception signal.

A respective signal representation (reference signal representation, measurement signal representation) can be a recording, which is digital, for example, of the corresponding ultrasonic reception signal over a predetermined reception time period. The respective signal representation can particularly preferably be a data-reduced representation of the corresponding ultrasonic reception signal.

The emission of the ultrasonic emission signal and the reception of the ultrasonic reception signal can be carried out, for example, using the same ultrasound sensor of the ultrasound sensor system. That is to say, the ultrasound sensor system only has to comprise a single ultrasound sensor. However, if the ultrasound sensor system comprises multiple, for example n, ultrasound sensors, multiple different signal paths, in the example $n^2$, can be formed. A signal path leads in this case from an emitting one of the ultrasound sensors to a receiving one of the ultrasound sensors, wherein the emitting and the receiving ultrasound sensor can be the same ultrasound sensor or can be different ultrasound sensors. The proposed steps can thus preferably be executed separately for each possible signal path of the ultrasound sensor system, wherein for each of the signal paths a separate reference signal base is stored and -used later in the noise compensation of the reference signal base which corresponds to the signal path used to acquire the measurement signal representation. Accordingly, a particularly exact noise compensation can be possible for each individual one of the signal paths.

According to one embodiment, in step a), the multiple reference signal representations are acquired in different conditions influencing noise.

In particular, a reference signal representation can preferably always be acquired if a condition influencing noise has changed by a predetermined amount or factor.

A self-adjusting system can therefore advantageously be created, which automatically acquires a further reference signal representation whenever an adaptation of the reference signal representation or the acquisition of a further reference signal representation is required due to a change of a condition influencing noise.

A respective condition influencing noise can preferably comprise one or more of the following variables: a temperature of an outer skin of the motor vehicle; a temperature of the ultrasound sensor; an age of the ultrasound sensor and/or the motor vehicle; an excitation mode of the ultrasonic emission signal; and the like.

An excitation mode of the ultrasonic emission signal can preferably comprise: a frequency, a signal form, and/or an amplitude of the emitted ultrasonic emission signal.

Values of the respective variables, as is relevant in each case, can be measured using sensors, for example, derived from the reference signal representations or the measurement signal representation, or provided by a control unit (ECU) which controls the operation of the ultrasound sensor.

According to a further embodiment, in step b) the respective condition influencing noise is stored linked with the respective reference signal representation (101, 102, 103).

That is to say, in step b) both the respective reference signal representation and the condition influencing noise prevailing at the time of the acquisition of the relevant reference signal representation are stored, and a link is established between the stored reference signal representation and the associated condition influencing noise.

Accordingly, at a later time, for example upon the selection in step e), a suitable reference signal representation can be determined among the stored reference signal representations with reference to a condition influencing noise and can be selected.

According to a further embodiment, the proposed method furthermore comprises c) generating a reference signal representation filtered of airborne sound echo signal components from one or more of the acquired and/or stored reference signal representations.

Accordingly, it can advantageously be ensured that obstacles which could be located in the surroundings of the motor vehicle upon acquisition of a reference signal representation, in particular at a standstill of the motor vehicle, and reflect an airborne sound echo to the ultrasound sensor, are not incorrectly suppressed during subsequent measurements.

The filtering can preferably be carried out by means of signal comparison to the multiple reference signal representations stored in step b).

The filtering can be carried out using mean value filters, logical links, or other filter mechanisms for eliminating undesired signal components in the reference signal representations. Methods for weighting reference signal representations in dependence on a trustworthiness of the respective reference measurement are also conceivable.

The filtering can take place in particular in such a way that only reference signal representations, in which signal components originating from airborne sound echoes are reduced and/or removed, are stored in the reference signal base. For the filtering, for example, the relevant signal components can be reduced and/or removed in the acquired or stored reference signal representations. It is also conceivable to generate a filtered reference signal representation from one or more of the acquired and/or stored reference signal representations. It is also conceivable to discard some of the acquired and/or stored reference signal representations which were not filtered or cannot be filtered, were judged to be untrustworthy, or the like. In this case, the acceptance or continued use of a reference signal representation which was not discarded can be understood as generating a filtered reference signal representation.

Step c) can be carried out before or after step b). That is to say, the acquired reference signal representations can be filtered and only filtered reference signal representations can be stored in step b). Alternatively thereto, initially all reference signal representations can be stored, and the filtering can be carried out once or periodically at a later point in time.

According to a further embodiment, for the filtering in step c), reference signal representations are selected which were acquired in identical or comparable conditions influencing noise, and the filtered reference signal representation is generated on the basis of a signal comparison of the selected reference signal representations.

In particular, it is advantageously not necessary for the multiple selected reference signal representations to have been acquired at around the same time as one another, since the reference signal representations stored at earlier times, possibly even several days before, can be used for the selection.

Specific conditions influencing noise are possibly only achieved when the vehicle is at a standstill and the engine is cold. When the vehicle is at a standstill, an obstacle in the surroundings of the vehicle does not change its position, however. The obstacle can nonetheless be identified by comparison to a reference signal representation, which was recorded in an earlier state with the same conditions influencing noise, since the obstacle was either not present at an earlier time or at least with overwhelming probability was not present at the same position. Position differences in the submillimeter range can be sufficient to identify the obstacle upon comparison of two reference signal representations.

Accordingly, it is advantageously possible to generate reference signal representations filtered of airborne sound echoes even in conditions influencing noise which only occur when the motor vehicle is at a standstill, and particularly error-free noise compensation can be performed on the measurement signal representations even when the motor vehicle is at a standstill (for example before it begins driving in the morning).

According to a further embodiment, in step e), the reference signal representation is selected on the basis of a condition influencing noise at the time of the acquisition of the measurement signal representation.

That is to say, one technique for selecting a suitable reference signal representation in step e) for use in step f) can preferably be to select a reference signal representation which was acquired in identical or comparable conditions influencing noise, which are present at the time of the acquisition of the measurement signal representation. A particularly exact noise compensation can advantageously take place in this way.

Comparable conditions influencing noise are to be understood in particular as conditions which deviate from one another by not more than a predetermined absolute value or factor.

The respective conditions influencing noise, which were present at the time of the acquisition of the respective reference signal representation, can be stored in step b), for example, linked to the respective reference signal representation. In some examples, however, they can also be implicitly derived from the reference signal representation whenever required.

According to a further embodiment, in step e), an interpolated reference signal representation is generated and selected from several of the stored reference signal representations on the basis of respective conditions influencing noise at the time of the acquisition of the several reference signal representations and the condition influencing noise at the time of acquisition of the measurement signal representation.

An interpolated reference signal representation can advantageously be used accordingly if the condition influencing noise at the time of the acquisition of the measurement signal representation is between two or more support points of the reference signal base. The noise compensation can thus take place particularly exactly.

According to a further embodiment, the respective condition influencing noise comprises a variable which is measured by a sensor integrated in the ultrasound sensor or attached to the motor vehicle.

Accordingly, the respective conditions influencing noise can be sensorially determined with high accuracy. A particularly well suitable reference signal representation can thus be selected in step e) and the quality of the noise compensation in step f) can therefore advantageously be improved.

According to a further embodiment, the respective condition influencing noise comprises a variable which is determined on the basis of the occurrence of a chronologically first structure-borne sound echo signal component in the respective reference signal representation or the measurement representation.

The variable can be, for example, the signal time-of-flight between emission of the ultrasonic emission signal and appearance of the first structure-borne sound echo. The variable can also be a temperature derived from the signal time-of-flight with reference to a calibration curve or the like.

A temperature sensor to be provided separately or the like can accordingly be advantageously omitted and the condition influencing noise can be determined directly from the respective signal representation.

According to a further embodiment, in step e), the selection is carried out on the basis of a comparison of the measurement signal representation to several of the stored reference signal representations.

In other words, it is advantageously not necessary for the selection in step e) to know the conditions influencing noise (to measure or derive them), which were present upon the acquisition of the reference signal representations and the measurement signal representations. Nonetheless, a deliberate selection of a suitable reference signal representation is possible.

A degree of a correspondence or a measure of a detuning between the measurement signal representation and the respective reference signal representation can be used, for example, as a comparison criterion.

According to a further embodiment, steps a) and b), and preferably also c), of the method are executed when the motor vehicle is driving and/or steps a) and b), and preferably also c), of the method are executed when the motor vehicle is at a standstill.

The mentioned steps can in particular also be executed when no relative movement takes place between motor vehicle and object in its surroundings, for example when a motor vehicle is parked in an underground garage. This is true in particular when the reference signal representations are filtered of airborne sound echoes as described above. Such filtering is possible with reference to multiple reference signal representations acquired during different parking processes under otherwise identical conditions influencing noise as soon as a reference signal representation is acquired again after renewed parking under otherwise identical conditions influencing noise.

Because the reference sound signals can be acquired and possibly filtered both when driving and also when the motor vehicle is at a standstill, a self-adjusting system can be created, which has optimally adjusted reference signal representations for an optimum noise correction in any driving or stationary situation into which it is brought by the driver.

According to a further embodiment, the respective reference signal representation and the measurement signal representation are each a data-reduced representation of the corresponding ultrasonic reception signal, which is obtained by frequency conversion of the ultrasonic reception signal by means of complex down conversion.

Because the method is carried out on data-reduced signal representations, storage space can be saved, for example, of a control unit (ECU) which implements the proposed method, or more reference signal representations can be stored for a larger number of support points. Moreover, bandwidth is advantageously saved in the transmission of the items of signal information from the ultrasound sensor to the control unit or the transmission can be implemented within a given restricted bandwidth if the ultrasound sensor already generates such a data-reduced signal representation and only transmits the data-reduced signal representation to the control unit.

The data reduction by complex down conversion can take place, for example, in that the ultrasonic reception signal is converted by means of an IQ mixer into the baseband and the respective signal representation is acquired on the basis of the converted signal in the baseband. A respective signal representation can therefore comprise an I component (real component) and a Q component (imaginary component). Alternatively, a respective signal representation can comprise an amplitude component and a phase component. In both cases, both the items of amplitude information and phase information of the original ultrasonic reception signal are advantageously retained, and the computational noise compensation can be executed with higher accuracy and supply more usable results than if, for example, only the items of amplitude information are contained in a simpler data-reduced representation, such as an envelope curve.

According to a further embodiment, in steps a) and d), the respective reference signal representation and the measurement signal representation are each acquired in that the ultrasound sensor receiving the corresponding ultrasonic reception signal determines two signal components of the ultrasonic reception signal by means of complex down conversion, transmits the determined down-converted signal components to a control unit of the motor vehicle, and the control unit reconstructs a raw signal representation of the ultrasonic reception signal with reference to the received down-converted signal components.

In particular, the raw signal representation reconstructed in this way can be used or acquired by the control unit as the respective reference signal representation or the measurement signal representation.

The respective receiving ultrasound sensor can accordingly advantageously transmit a data-reduced representation (the two signal components, such as an I signal component and a Q signal component) of the ultrasonic reception signal to save bandwidth. On the other hand, the control unit, which can have a high computing power, can reconstruct the respective reference signal representation and the measurement signal representation from the transmitted data-reduced representation in such a way that the respective signal representation is a raw signal representation of the corresponding ultrasonic reception signal. Such a raw signal representation can depict all essential items of information of the raw ultrasonic reception signal, in particular the items of amplitude and phase information thereof. In spite of small amounts of transmitted data, a better quality noise-compensated measurement signal representation can thus result in the proposed method, which has, for example, a better signal-to-noise ratio, that more cleanly resolves the shape of the airborne sound echoes contained therein and more of the like. In particular, the computational noise compensation can take place with an accuracy which essentially corresponds to an accuracy which would be achieved if the ultrasound sensor were to transmit the raw ultrasonic reception signals and raw signal representations would be acquired with reference to the raw ultrasonic reception signals and the computational noise compensation were carried out with reference to the raw signal representations (raw reference signal representation, raw measurement signal representation).

In a second aspect, a method for surveying the surroundings of a motor vehicle is proposed, which comprises the steps of the method for computational noise compensation as claimed in any one of the preceding claims, wherein at least one distance to an obstacle in the surroundings of the motor vehicle is determined with reference to the appearance of airborne sound echo signal components in the noise-compensated measurement signal representation.

The distance can therefore advantageously be determined more exactly.

The distance can be calculated with reference to a signal time-of-flight between emission of the control signal and reception of the first airborne sound echo in the noise-compensated measurement signal representation and the known speed of sound.

With reference to the determined distance, a warning tone can be output if the determined distance falls below a minimum distance. The determined distance can also be provided to a driving or parking assistance system, which controls semiautonomous or fully autonomous driving or parking of the motor vehicle.

In a third aspect, an ultrasound sensor system for a motor vehicle is proposed, comprising at least one ultrasound sensor and means which are suitable for carrying out the steps of the method according to the first or second aspect or one of the embodiments thereof.

The means can comprise a processor, a memory, an application-specific integrated circuit (ASIC), a control unit (ECU), and the like. The means can be provided centrally or can be provided separately for each of the ultrasound sensors.

In a fourth aspect, a motor vehicle is proposed which comprises the ultrasound sensor system of the third aspect.

The motor vehicle can be a passenger vehicle, a truck, an electric bicycle, a vessel, a robot, and the like. The motor vehicle can preferably have an assistance system for semiautonomous or fully autonomous driving.

Moreover, a computer program product is proposed comprising commands which cause the ultrasound sensor system according to the third aspect to carry out the method according to the first or second aspect and a computer-readable storage medium on which the computer program product is stored.

The features, advantages, and embodiments described for the proposed method according to the first or second aspect also apply accordingly to the proposed ultrasound sensor system, the proposed motor vehicle, the proposed computer program product, and the proposed computer-readable storage medium.

Further possible implementations of the invention also comprise not explicitly mentioned combinations of features or embodiments described above or below with regard to the exemplary embodiments. A person skilled in the art will in this case also add individual aspects as improvements or additions to the respective basic form of the invention.

Further advantageous configurations and aspects of the invention are the subject of the dependent claims and of the exemplary embodiments of the invention that are described below. The invention is explained in more detail below on the basis of preferred exemplary embodiments with reference to the accompanying figures:

Identical or functionally identical elements have been provided with the same reference signs in the figures, unless stated otherwise.

Figure 1:
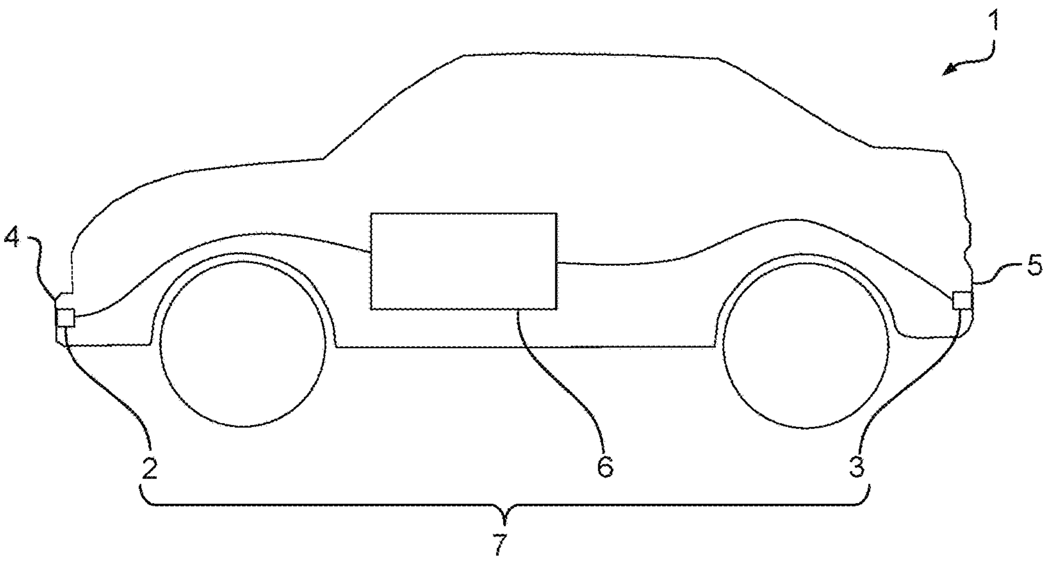
FIG. 1 shows a motor vehicle having an ultrasound sensor system according to exemplary embodiments.

FIG. 1 shows a motor vehicle 1 having an ultrasound sensor system 7 according to exemplary embodiments. In the motor vehicle 1, a first ultrasound sensor 2 is installed on a front bumper 4 and a second ultrasound sensor 3 is installed on a rear bumper 5. The ultrasound sensor 2 is installed covered, for example, i.e., it is arranged behind the front bumper 4 and is invisible from the outside. The ultrasound sensor 3 is installed uncovered, for example, i.e., it is visible from the outside. The ultrasound sensor 3 is inserted, for example, with a sealing ring (not shown) into an opening (not shown) in the rear bumper 5. The bumpers 4, 5 are body components, which form an outer skin 8 (FIG. 2) of the motor vehicle 1 together with further body components.

The motor vehicle 1 is equipped with a control unit (ECU) 6, which has a communication connection to the ultrasound sensors 2, 3 and is configured to survey the surroundings of the motor vehicle 1 with the aid of the ultrasound sensors 2, 3. The ultrasound sensors 2, 3 and the control unit 6 jointly form an ultrasound sensor system 7.

Figure 2:
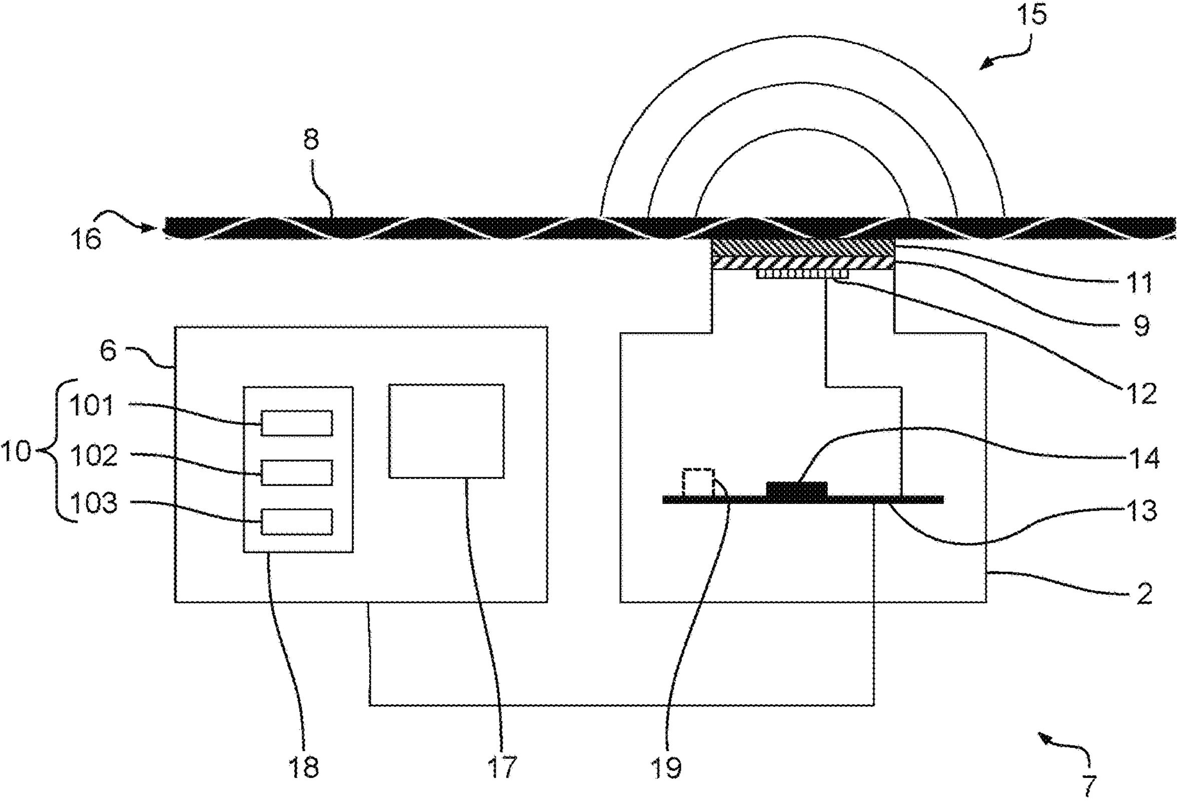
FIG. 2 shows an ultrasound sensor system according to exemplary embodiments.

FIG. 2 shows an ultrasound sensor system 7 according to exemplary embodiments in more detail. The ultrasound sensor system 7 comprises the ultrasound sensor 2 and the control unit 6. The control unit 6 controls the operation of the ultrasound sensor 2. The control unit 6 comprises a processor 17 and a memory 18. The memory 18 is preferably a nonvolatile memory, such as a flash memory, an EEPROM, a magnetic memory, or the like.

The ultrasound sensor 2 is installed covered behind an outer skin 8 of a motor vehicle 1 (FIG. 1). An ultrasound membrane 9 of the ultrasound sensor 2 is coupled via a coupling element 11 to the outer skin 8 of the motor vehicle 1 (FIG. 1). A piezoelectric element 12, which is electrically connected to an actuation element 14 arranged on a circuit board 13, is attached to an inside of the ultrasound membrane 9. When an ultrasonic emission signal is to be emitted, the actuation element 14 actuates the piezoelectric element 12 using electrical signals, whereupon the piezoelectric element 12 excites the ultrasound membrane 9 to oscillations. The oscillations are transmitted via the coupling element 11 to the vehicle outer skin 8, which is therefore also excited to oscillations. Airborne sound 15 is emitted. Moreover, structure-borne sound 16 propagates in the vehicle outer skin 8. When the airborne sound 15 is reflected at an obstacle (not shown) in the surroundings of the motor vehicle 1 (FIG. 1), an airborne sound echo runs back to the vehicle outer skin 8 and excites it to oscillations, which are passed on via the coupling element 11 to the ultrasound membrane 9 and are converted by the piezoelectric element 12 into an electrical signal, which is also referred to as the ultrasonic reception signal. The structure-borne sound 16 can also be reflected in the outer skin 8 and run back to the ultrasound sensor 2. A structure-borne sound echo signal component can therefore also be superimposed on the airborne sound echo signal component of the ultrasonic reception signal.

The control unit 6 prompts the ultrasound sensor 2 (the actuation element 14 of the ultrasound sensor 2) to emit ultrasonic emission signals and receives ultrasonic reception signals from the ultrasound sensor 2 and acquires signal representations (measurement signal representations and/or reference signal representations) of the received ultrasonic reception signals. Acquired reference signal representations 101-103 are stored in the memory 18 of the control unit 6 and form a reference signal base 10. Received measurement signal representations are noise-compensated with reference to the reference signal representations 101-103 of the reference signal base 10, which will be described in detail below. The control unit 6 determines a distance to an obstacle in the surroundings of the motor vehicle 1 (FIG. 1) with reference to the appearance (the time of the appearance) of airborne sound echo signal components in the noise-compensated measurement signal representations.

It is to be noted that the ultrasound sensor 2 having the actuation element 14, the ultrasound membrane 9, and the piezoelectric element 12 as well as the control unit 6 having the processor 17 and the memory 18 represent means for carrying out a proposed method described later. The method steps are prompted in this case by the actuation element 14 and/or by the processor 17 of the control unit 6 and executed with the aid of the further elements of the control unit and of the ultrasound sensor 2.

Figure 3:
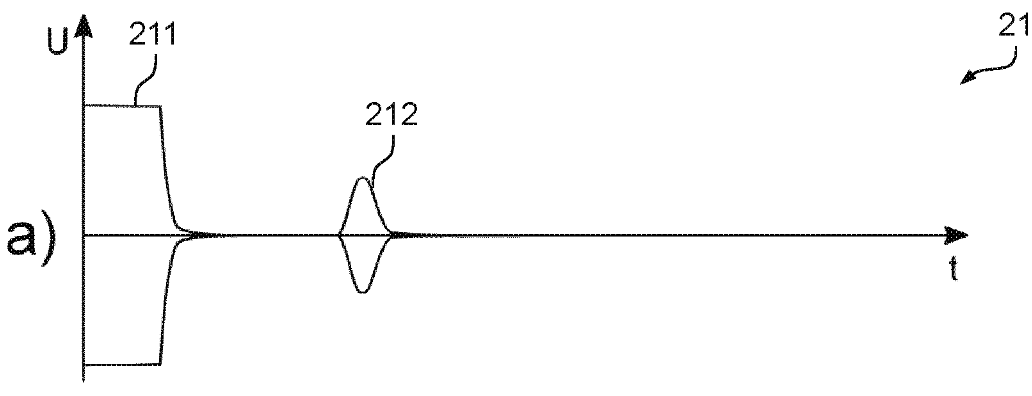
FIG. 3 is a representation to explain the principle of the computational noise compensation and shows plots of exemplary signal representations.
Figure 3:
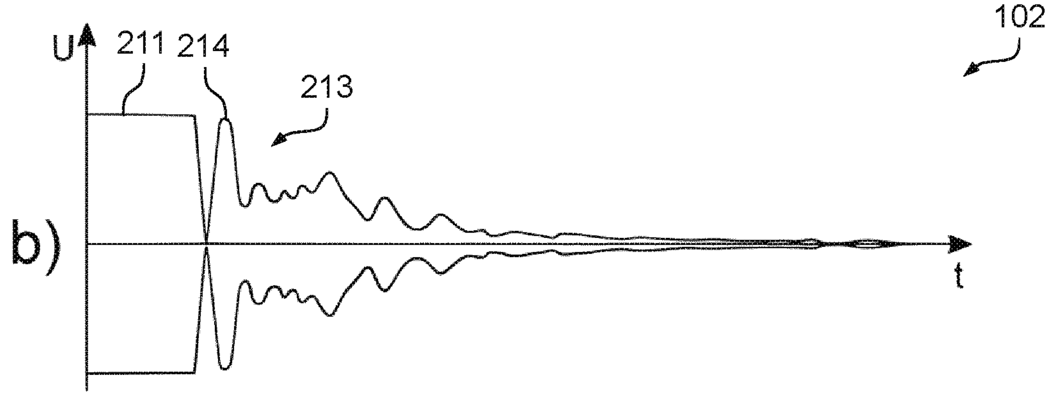
Figure 3:
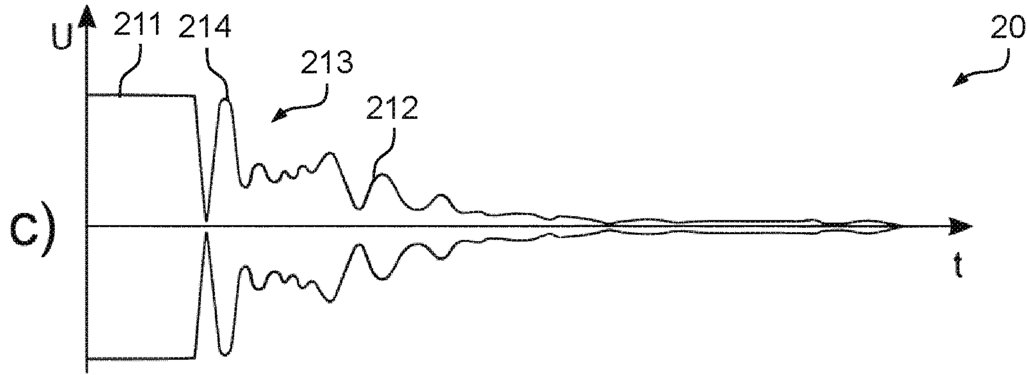
Figure 3:
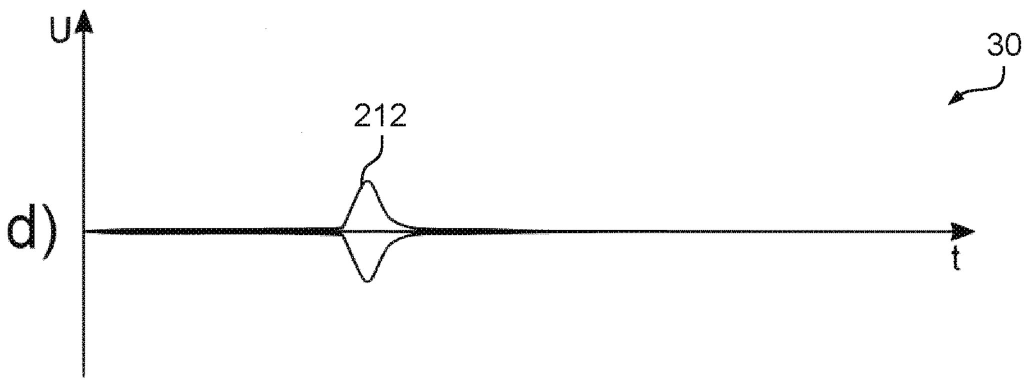

FIG. 3 is a representation to explain the principle of the computational noise compensation and shows graphic plots of exemplary signal representations 21, 102, 20, 30. The signal representations shown are data-reduced representations, which only represent an envelope curve having items of amplitude information about the received ultrasonic reception signals and serve solely for illustration. Actually, in preferred exemplary embodiments, the computational noise compensation is preferably carried out on the basis of signal representations which comprise at least items of amplitude information and phase information about the received ultrasonic reception signals.

In respective plots a) to d), the time t is plotted on the horizontal axis and the amplitude, represented as voltage U, is plotted on the vertical axis.

FIG. 3 *a*) shows a measurement signal representation 21, as is acquired by the ultrasound sensor installed uncovered (3 in FIG. 1) when an obstacle is arranged in the surroundings of the motor vehicle (1 in FIG. 1). After emission of an ultrasonic emission signal (a pulse modulated onto a carrier frequency) at time t=0 (i.e., at the origin), initially the reverberation of the ultrasound membrane (9 in FIG. 2) is to be observed in the measurement signal representation 21. In the reverberation time, a saturated reverberation signal component 211 results, which only drops to zero after some time. The time until the saturated reverberation signal component 211 drops away is also referred to as the dead time. An airborne sound echo signal component 212 appears in the measurement signal representation 21 at a later time. A distance to the obstacle can be determined on the basis of the time of the appearance of this airborne sound echo signal component 212, in that half the signal time-of-flight is multiplied by the speed of sound in air.

FIG. 3 *b*) shows a signal representation 102 as is acquired by the ultrasound sensor (2 in FIG. 1) installed covered when no obstacle is arranged in the surroundings of the motor vehicle 1 (FIG. 1). The signal representation 102 shows, after the reverberation time, i.e. following the appearance of the reverberation signal component 211, a number of structure-borne sound echo signal components 213, which are to be attributed to reflections of the structure-borne sound 16 (FIG. 2) in the vehicle outer skin 8. The signal representation 102 is also referred to as the reference signal representation 102, since it specifies a reference for a structure-borne sound pattern which results when no obstacle is present.

FIG. 3 *c*) shows a measurement signal representation 20, as is acquired by the ultrasound sensor 2 installed covered (in FIG. 2) when an obstacle is arranged in the surroundings of the motor vehicle 1 (FIG. 1). In the measurement signal representation 20, the structure-borne sound echo signal components 213 are superimposed on the airborne sound echo signal component 212; the airborne sound echo signal component 212 is only still visible as a slight widening of one of the structure-borne sound echo signal components 213 and is detectable automatically with difficulty or not at all. An undesired lengthening of the dead time therefore results.

FIG. 3 *d*) shows a signal representation 30 which results when, in the course of a computational noise compensation, the reference signal representation 102 from FIG. 3 *b*) is subtracted from the measurement signal representation 20 from FIG. 3 *c*). The airborne sound echo component 212 can now be seen clearly and is automatically detectable easily. The signal-to-noise ratio is drastically improved; in addition, the noise-compensated measurement signal representation 30 does not reach saturation at any time; essentially no dead time thus results.

The technical effect of an improvement of the signal-to-noise ratio of the noise-compensated measurement signal representation 30 and a reduction of the dead time of the ultrasound sensor 2 (FIGS. 1, 2) only occurs, however, when the reference signal representation 102 only contains structure-borne sound echo signal components 213 which are identical to those structure-borne signal components 213 which appear upon acquisition of the measurement signal representation 20.

Reference is made to FIG. 1 to FIG. 3. Numerous conditions influencing noise have an influence on the expression of the structure-borne sound 16 in the outer skin 8 of the motor vehicle 1. Examples of conditions influencing noise comprise the temperature of the vehicle outer skin 8 and/or the temperature of the ultrasound sensor 2 correlating with it and material properties of the ultrasound sensor 2 and the outer skin 8, which can change with increasing age of the materials. If the propagation speed of the structure-borne sound 16 changes, the structure-borne sound echo signal components 213 of the signal representations 102, 20 shown in FIG. 3 are stretched or compressed by different amounts along the time axis. Damping properties, which have changed in the course of time, of the outer skin and/or adjoining vehicle parts or of materials applied to the outer skin 8 to reduce the propagation of the structure-borne sound 16 can also have an effect on the form, number, amplitude, phasing, and the like of the structure-borne sound echo signal components 213. Furthermore, the structure-borne sound echo signal components 213 also change depending on an excitation mode of the ultrasound sensor 2, i.e. on the frequency, the signal form, and the amplitude of the emitted ultrasonic emission signal; these also represent examples of conditions influencing noise. If the reference signal representation 102 was acquired in different conditions influencing noise than the measurement signal representation 20, a detuning results because of different structure-borne sound echo signal components in the signal representations 102, 20, and upon subtraction the noise-compensated measurement signal representation 30 does not result, but rather a signal representation having phantom signal components and bad signal-to-noise ratio, in which the airborne sound echo signal component 212 is possibly no longer clearly detectable.

If conditions influencing the noise change, the reference signal representation 102 is therefore to be updated. However, if an obstacle is located in the surroundings of the motor vehicle 1 during such an update, the airborne sound echo signal component 212 resulting from the obstacle is thus incorrectly treated as a structure-borne sound echo signal component. As a result, the airborne sound echo signal component 212 of a measurement signal representation 20 acquired following the acquisition of the reference signal representation 102 would also be subtracted upon the subtraction and the obstacle would thus be hidden.

Exemplary embodiments are presented hereinafter which show advantageous embodiments to obtain suitable reference signal representations 102 for a computational noise compensation according to the above-described principle in consideration of the above-described problem of the variable conditions influencing noise.

Figure 4:
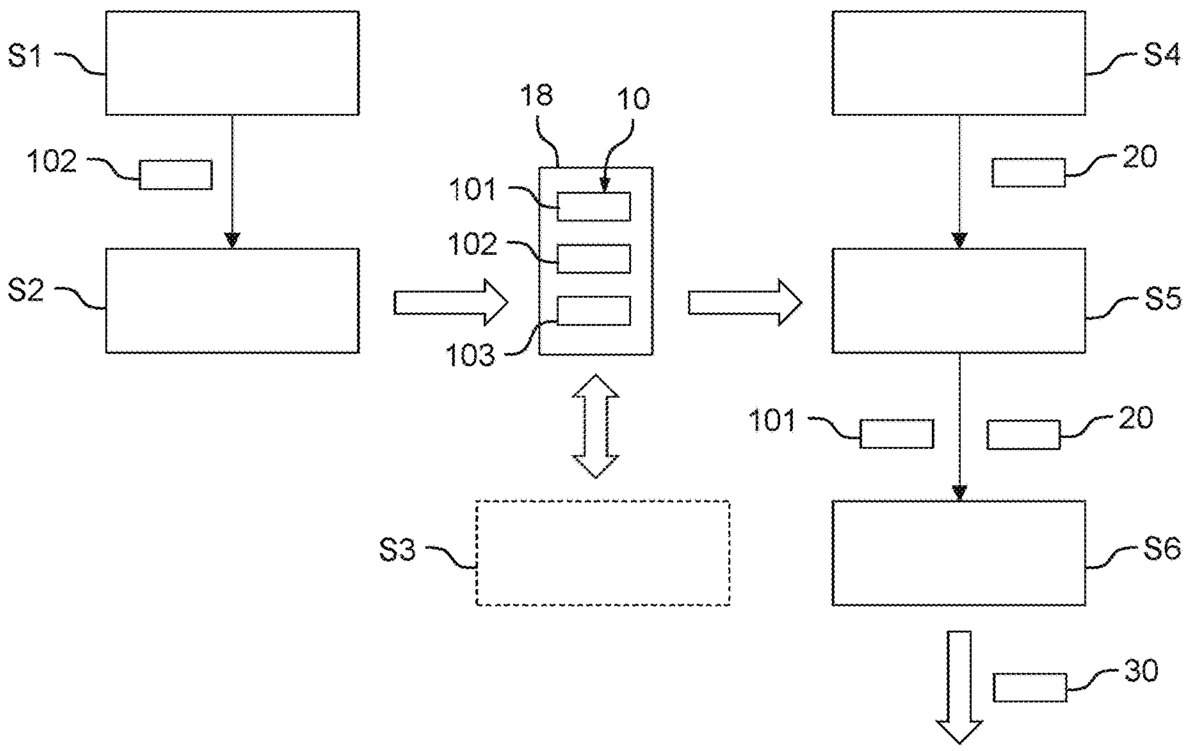
FIG. 4 illustrates the method for noise compensation according to exemplary embodiments.

FIG. 4 illustrates the method for noise compensation according to exemplary embodiments. The description is carried out with reference to FIG. 4 and also reference back to FIGS. 1, 2, and 3.

According to a first exemplary embodiment, in step S1, a reference signal representation 102 is acquired. That is to say, an ultrasonic emission signal is emitted and an ultrasonic reception signal is received using the ultrasound sensor 2 and a representation of the ultrasonic reception signal, which is preferably digital and is particularly preferably data-reduced, is acquired as the reference signal representation 102 by the ultrasound sensor 2.

Step S1 is repeated multiple times at different times in order to acquire further reference signal representations 101 and 103. A respective acquired reference signal representation 101, 102, 103 is stored in step S2 in the memory 18 of the control unit 6 for later use. In this way, a reference signal base 10 is created, which comprises a large number of reference signal representations 101, 102, 103 acquired at different times and therefore potentially also under different conditions influencing noise.

If the surroundings of the motor vehicle 1 are to be surveyed, a measurement signal representation 20 is acquired in step S4 in the same way as described for step S1. In step S5, with knowledge of the acquired measured signal representation 20 and the reference signal base 10 stored in the memory 18, a suitable one of the stored reference signal representations 101 is then selected. In step S6, the noise-compensated measurement representation 30 is then generated by subtracting the selected reference signal representation 101 from the acquired measurement signal representation 20.

Thanks to the reference signal base 10, which comprises a large number of reference signal representations 101, 102, 103 acquired at different times, a respective suitable reference signal representation 101 can advantageously be selected upon each measurement. Suitable is to be understood to mean, for example, that the selected reference signal representation 101 for the relevant measurement maximizes the signal-to-noise ratio of the noise-compensated measurement representation 30.

According to one exemplary embodiment, the selection in step S5 is carried out with reference to a comparison of the measurement signal representation 20 with several or all of the reference signal representations 101, 102, 103 of the reference signal base 10.

According to one exemplary embodiment, the reverberation signal components 211 of the respective signal representations 20, 101, 102, 103 can be compared to one another. The comparison can be carried out with reference to characteristic features of the respective structure-borne sound echo signal components 213.

According to one exemplary embodiment, the comparison is carried out in that a quality of the structure-borne sound compensation of the measurement signal representation 20 is quantified using the respective reference signal representation 101, 102, 103 of the reference signal base 10. The quality of the structure-borne sound compensation, i.e. the degree of correspondence between reference signal representation 101, 102, 103 and measurement signal representation 20, can be quantified, for example, with reference to an effective value, a maximum in absolute value, or a statistical measure of the amplitude distribution of the difference signal representation 30 remaining after subtraction of the respective reference signal representation from the measurement signal representation 20.

The reference signal representation 101 having the best quantified correspondence can thus be selected. At the same time, it is also ensured that a reference signal representation 101, 102, 103 is not inadvertently selected which incorrectly includes airborne sound echo signal components 212, since with such a reference signal representation 101, 102, 103 in most practical cases a lower degree of correspondence would result.

According to one exemplary embodiment, in step S2, one or more conditions influencing noise are linked with the respective reference signal representation 101, 102, 103 and stored together with the respective reference signal representation 101, 102, 103 in the memory 18. For example, a parameter can be computed which indicates the relative time of the appearance of a first structure-borne sound signal echo component 214 in the reference signal representation 101, 103. Such a parameter is indicative of the speed of sound propagation of the structure-borne sound 16 in the vehicle outer skin 8. A temperature in the vehicle outer skin 8 can also be inferred from the parameter with reference to a calibration curve. Moreover, items of information about the excitation mode of the ultrasound sensor 2 upon emission of the ultrasonic emission signal and/or items of information about the age of the ultrasound sensor 2 and/or the motor vehicle 1 can be provided by the control unit 6 and/or by the actuation element 14. According to one preferred refinement, the ultrasound sensor 2 moreover has a temperature sensor 19, using which a temperature of the ultrasound sensor 2 can be directly measured. The relative time of the appearance of the first structure-borne sound signal echo component 214, the temperature of the vehicle outer skin 8, the items of information about the age, the items of information about the excitation mode, and/or the temperature of the ultrasound sensor 2 are examples or indicators of conditions influencing noise, which can be stored linked with the reference signal representation 101, 103 in the memory 18. That is to say, the term "conditions influencing noise" can also, in addition to physical measured variables, comprise specifications which can be viewed as indicators of a physical measured variable influencing noise One or more conditions influencing noise, which were present during the acquisition of the measurement signal representation 20, can then be determined in step S5 in the same manner as described above for step S2. The selection of a reference signal representation 101 from the reference signal base 10 in step S5 can then be carried out by a comparison of the conditions influencing noise during the acquisition of the measurement signal representation 20 with the conditions influencing noise stored linked with the reference signal representations 101, 102, 103.

It can accordingly be ensured that a reference signal representation 101 is selected which was acquired under identical or comparable conditions influencing noise as are present during the acquisition of the measurement signal representation 20.

According to one preferred exemplary embodiment, if no exact correspondence of the conditions influencing noise is found in the reference signal base 10, an interpolated reference signal representation (not shown) can be generated and then selected in step S5 with reference to a condition influencing noise at the time of the acquisition of the measurement signal representation 20 and the conditions influencing noise at the times of the acquisition of at least two of the multiple reference signal representations 101, 102, 103 by interpolation. The interpolation can be carried out one-dimensionally or also in multiple dimensions when working with multiple types of conditions influencing noise (such as temperature, age, and excitation mode). The interpolation can particularly preferably take place iteratively, wherein a quality of the structure-borne sound compensation resulting using the respective interpolated reference signal representation is iteratively optimized.

The described exemplary embodiments for the selection in step S5 can also be combined. Thus, for example, with reference to the conditions influencing noise during the acquisition of the measurement signal representation 20, a preselection can first be made from the reference signal base 10, which comprises reference signal representations 101, 102, 103 which were acquired in comparable conditions influencing noise. Each of the preselected reference signal representations 101, 102, 103 can then be subtracted from the measurement signal representation 20 and the one of the preselected reference signal representations 101 can be selected for the noise correction of step S6 for which a highest degree of correspondence, i.e. a greatest signal-to-noise ratio and/or a smallest proportion of remaining structure-borne sound echo signal components 213, results in the difference signal representation 30.

A particularly exact noise-compensated measurement signal representation 30 can accordingly advantageously be obtained and used for the particularly exact surveying of the surroundings of the motor vehicle 1.

It is described in more detail hereinafter how the reference signal base 10 can be created and maintained.

According to one exemplary embodiment, the multiple reference signal representations 101, 102, 103 are acquired in different conditions influencing noise. For example, step S1 can always be carried out controlled by events when at least one condition influencing noise changes by more than a predetermined relative or absolute value.

According to one exemplary embodiment, the method furthermore comprises a step S3, in which the reference signal base 10 is filtered. Filtering is to be understood in this case to mean that airborne sound echo signal components 212 in the reference signal representations 101, 102, 103 are reduced or removed and/or that further reference signal representations 101, 102, 103 are generated, in which the airborne sound echo signal components 212 are reduced or removed, and/or that untrustworthy reference signal representations 101, 102, 103 are discarded.

For example, methods for weighting the reference signal representations 101, 103 can be used in order to discard untrustworthy reference signal representations 101, 103.

For example, mean value filters, logical links, or other filter mechanisms can be used in order to filter the reference signal representations 101, 102, 103 of airborne sound echo signal components 212.

In one preferred exemplary embodiment, in step S3, several of the reference signal representations 101, 102, 103 are selected from the reference signal base 10, which were acquired in identical or comparable conditions influencing noise. The selected reference signal representations 101, 102, 103 are then compared to one another.

For example, for the comparison the selected reference signal representations 101, 102, 103 can be subtracted from one another with commutation in succession. In this way, one or more airborne sound echo signal components 212 can be identified on the basis of the resulting difference signal representations 30. Correspondingly filtered reference signal representations 101, 102, 103 can then be generated by subtracting the identified airborne sound echo signal components 212 from the selected reference signal representations 101, 102, 103.

Step S3 for filtering can be carried out before step S2, i.e. with reference to each newly acquired reference signal representation 102 and the already known reference signal base 10 at this time, initially a filtered reference signal representation 102' is generated and this is then added in step S2 to the reference signal base 10.

However, in other exemplary embodiments, step S3 can also be carried out independently of step S1 and S2 directly on the reference signal base 10 and filter it, for example at regular time intervals or whenever the reference signal base 10 has stored a reference signal representation 102 having associated conditions influencing noise and a reference signal representation 101, 103 is already stored in the reference signal base 10 for these or comparable conditions influencing noise.

Such a filtering step S3 is useful in particular in exemplary embodiments in which steps S1, S2, thus the acquisition and storage of reference signal representations 101-103, are carried out continuously or at regular time intervals. For example, the reference signal base 10 can be updated continuously when the motor vehicle 1 is driving and/or also when the motor vehicle 1 is at a standstill. The possibility exists here that during the acquisition of a reference signal representation 101-103, an object was located in the surroundings of the motor vehicle 1 and airborne sound echo signal components originating from the object are included in the acquired reference signal representations 101-103, which are to be filtered. When the motor vehicle 1 is at a standstill in a state in which any objects in the surroundings of the motor vehicle 1 are also not moving, for example when parked in an underground garage, one or more reference signal representations acquired during a single parking process cannot be filtered alone. However, it is extremely improbable that during repeated parking of the motor vehicle 1—even if this takes place in the same garage—an obstacle in the garage is positioned with millimeter accuracy identically relative to the motor vehicle 1. If reference signal representations 101, 102, 103, for example from a respective standstill of the motor vehicle 1 from the present day and from previous days with the same condition influencing noise, are contained in the reference signal base 10, a position difference of the obstacle in the garage in the submillimeter range is already sufficient in order to identify the respective airborne sound echo signal components 212 to be attributed to the obstacle using the above-described filtering method by subtraction and to filter the reference signal representations 101, 102, 103 accordingly.

By way of the listed options for the running maintenance of the reference signal base 10, a reference signal base 10 can be created which comprises high-value reference signal representations 101, 102, 103 which are filtered of airborne sound echo signal components 102 in the best possible manner, and this is also the case if the reference signal representations 101, 102, 103 were originally acquired in critical situations with obstacles in the surroundings of the motor vehicle 1.

Accordingly, the quality of the noise-compensated measurement signal representation 30 and thus the quality of the obstacle detection and the like can advantageously be improved.

Although the invention was described with reference to exemplary embodiments, it is modifiable in a variety of ways.

In the exemplary embodiments, an ultrasound sensor 2 installed covered and structure-borne sound 16 in the vehicle outer skin 8 as noise were primarily described. However, the proposed method is also applicable to ultrasound sensors 3 installed uncovered. The reverberation signal component 211 visible in the measurement signal representation 20 due to the reverberations of the ultrasound membrane 9 after emission of the ultrasonic emission signal can thus also be viewed as noise and compensated for by signal subtraction in the same manner as the structure-borne sound echo signal components 213 in the case of the ultrasound sensor 2 installed covered. The dead time of the ultrasound sensor 2 installed uncovered can advantageously be reduced or eliminated in this way.

It was described in the exemplary embodiments that the means of the ultrasound sensor system 7 for carrying out the proposed method comprise the control unit 6 and the actuation element 14. In this case, the actuation element 14 can comprise, for example, a simple circuit for impedance adaptation and an analog-to-digital converter. The actuation element 14 can also be an application-specific integrated circuit (ASIC), however, and can assume a part of the processing to carry out steps S1 to S6 itself. The entire proposed method can also be implemented using the ASIC 14 and carried out without the presence of a separate control unit 6. In this case, the memory 18 can be provided on the circuit board 13 of the ultrasound sensor 2.

Only a single covered ultrasound sensor 2 was described in the exemplary embodiments for the sake of simplicity. However, it is obvious that the proposed method is applicable to ultrasound sensor systems 7 having multiple ultrasound sensors 2, 3. The structure-borne sound pattern with identical conditions influencing noise is typically different for each ultrasound sensor 2, 3, therefore in this case multiple reference signal bases 10 independent of one another are preferably stored in the memory 18, each of which is assigned to one of the ultrasound sensors 2, 3.

The mentioned conditions influencing noise are solely examples. Other influencing variables can be taken into consideration, such as items of weather information which can be acquired from light sensors, rain sensors, and the like.

The exemplary embodiments were described with reference to simplified envelope curves 20, 30, 102 shown in FIG. 3. In fact, the method is preferably carried out with reference to signal representations 20, 30, 101-103, which at least comprise items of amplitude and phase information about the respective ultrasonic reception signal. For example, the actuation element 14 of the ultrasound sensor 2, 3 can be an ASIC which implements an IQ mixer. This can carry out a complex downward conversion of the received ultrasonic reception signal into the baseband. The complex down conversion supplies an I signal component and a Q signal component of the ultrasonic reception signal (example of a data-reduced representation of the ultrasonic reception signal). This data-reduced representation can be transmitted to the control unit 6 of the motor vehicle 1.

According to a preferred refinement, the control unit 6 then carries out the above-described method separately both with reference to the I signal components and with reference to the Q signal components, so that a noise-signal-compensated measurement signal representation 30 is generated, which comprises noise-compensated I signal components and noise-compensated Q signal components. A data-reduced, noise-compensated representation similar to an envelope curve of the respective ultrasonic reception signal can be calculated therefrom if needed—to determine and classify airborne sound echoes, to determine the distance to obstacles in the surroundings of the motor vehicle 1, and the like.

According to another preferred refinement, the control unit 6 can initially reconstruct a raw signal representation of the received ultrasonic reception signal from the I signal components and the Q signal components. That is to say, the method can be carried out with reference to raw signal representations and the generated noise-compensated measurement signal representation 30 can comprise a noise-compensated raw signal representation of the measured ultrasonic reception signal. In this way, in spite of data-reduced transmission between the ultrasound sensor 2, 3 and the control unit 6, a high-quality noise-compensated measurement signal representation 30 can be generated by the control unit 6.

LIST OF REFERENCE SIGNS

1 motor vehicle
2, 3 ultrasound sensor
4, 5 bumper
6 control unit
7 ultrasound sensor system
8 outer skin
9 ultrasound membrane
10 reference signal base
11 coupling element
12 piezoelectric element
13 printed circuit board
14 actuation element
15 airborne sound
16 structure-borne sound
17 processor
18 memory
19 temperature sensor
20 measurement signal representation
21 measurement signal representation of an uncovered ultrasound sensor
22 noise-compensated measurement signal representation, difference signal representation
101 selected reference signal representation
102 reference signal representation
103 reference signal representation
211 reverberation signal component
212 airborne sound echo signal component
213 structure-borne sound echo signal components
214 chronologically first structure-borne sound echo signal component
S1-S6 method steps

The invention claimed is:

1. A method for computational noise compensation for an ultrasound sensor system of a motor vehicle the method comprising:

acquiring multiple reference signal representations at different points in time in each case by emitting an ultrasonic emission signal using an ultrasound sensor of the ultrasound sensor system and receiving an ultrasonic reception signal using the same or another ultrasound sensor of the ultrasound sensor system;

storing the multiple reference signal representations;

acquiring a measurement signal representation by emitting an ultrasonic emission signal using the ultrasound sensor and receiving an ultrasonic reception signal using the same or the other ultrasound sensor;

selecting one of the stored reference signal representations; and generating a noise-compensated measurement signal representation by subtracting the selected reference signal representation from the acquired measurement signal representation.

2. The method for computational noise compensation as claimed in claim 1, wherein in acquiring multiple reference signal representations, the multiple reference signal representations are acquired in different conditions influencing noise.

3. The method for computational noise compensation as claimed in claim 2, wherein in storing the multiple reference signal representations, the respective condition influencing noise is stored linked with the respective reference signal representation.

4. The method for computational noise compensation as claimed in claim 1, wherein the method further comprises:

generating a reference signal representation filtered of airborne sound echo signal components from one or more of the acquired or stored reference signal representations.

5. The method for computational noise compensation as claimed in claim 4, wherein in generating a reference signal representation, reference signal representations are selected which were acquired in identical or comparable conditions influencing noise, and the filtered reference signal representation is generated with reference to a signal comparison of the selected reference signal representations.

6. The method for computational noise compensation as claimed in claim 1, wherein in selecting one of the stored reference signal representations, the reference signal representation is selected with reference to a condition influencing noise at the time of the acquisition of the measurement signal representation.

7. The method for computational noise compensation as claimed in claim 6, wherein in selecting one of the stored reference signal representations, an interpolated reference signal representation is generated and selected from several of the stored reference signal representations with reference to respective conditions influencing noise at the time of the acquisition of the several reference signal representations and the condition influencing noise at the time of the acquisition of the measurement signal representation.

8. The method for computational noise compensation as claimed in claim 1, wherein the respective condition influencing noise comprises a variable which is measured by a sensor integrated in the ultrasound sensor or in the further ultrasound sensor or attached to the motor vehicle.

9. The method for computational noise compensation as claimed in claim 2, wherein the respective condition influencing noise comprises a variable which is determined with reference to the appearance of a chronologically first structure-borne sound echo signal component in the respective signal representation.

10. The method for computational noise compensation as claimed in claim 1, wherein in selecting one of the stored reference signal representations, the selection is carried out with reference to a comparison of the measurement signal representation to several of the stored reference signal representations.

11. The method for computational noise compensation as claimed in claim 1, wherein acquiring and storing multiple reference signal representations occurs when the motor vehicle is driving or is at a standstill.

12. The method for computational noise compensation as claimed in claim 1, wherein the respective reference signal representation and the measurement signal representation are each a data-reduced representation of the corresponding ultrasonic reception signal which is obtained by frequency conversion of the ultrasonic reception signal by means of complex down conversion.

13. The method for computational noise compensation as claimed in claim 1, wherein in acquiring multiple reference signal representations and acquiring a measurement signal representation, the respective reference signal representation and the measurement representation are each acquired in that the ultrasound sensor receiving the corresponding ultrasonic reception signal determines two signal components of the ultrasonic reception signal by means of complex down conversion, transmits the determined down-converted signal components to a control unit of the motor vehicle, and the control unit reconstructs a raw signal representation of the ultrasonic reception signal with reference to the received down-converted signal components.

14. A method for surveying the surroundings of a motor vehicle, comprising the steps of the method for computational noise compensation as claimed in claim 1, wherein at least one distance to an obstacle in the surroundings of the motor vehicle is determined with reference to the appearance of airborne sound echo signal components in the noise-compensated measurement signal representation.

15. An ultrasound sensor system for a motor vehicle, the system comprising at least one ultrasound sensor and means which are suitable for carrying out the steps of the method as claimed in claim 1.

16. A motor vehicle, comprising the ultrasound sensor system as claimed in claim 15.

17. A non-transitory computer readable medium, comprising program instructions which cause an ultrasound sensor system to carry out the method as claimed in claim 1.

* * * * *